United States Patent
Zhu et al.

(10) Patent No.: US 11,463,303 B2
(45) Date of Patent: Oct. 4, 2022

(54) DETERMINING THE HEALTH OF OTHER NODES IN A SAME CLUSTER BASED ON PHYSICAL LINK INFORMATION

(71) Applicant: Oracle International Corporation, Redwood Shores, CA (US)

(72) Inventors: Ming Zhu, Redwood City, CA (US); Andrey Gusev, Dublin, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/095,917

(22) Filed: Nov. 12, 2020

(65) Prior Publication Data

US 2021/0067404 A1 Mar. 4, 2021

Related U.S. Application Data

(63) Continuation of application No. 16/125,992, filed on Sep. 10, 2018, now Pat. No. 10,868,709.

(51) Int. Cl.
| | |
|---|---|
| *H04L 41/0668* | (2022.01) |
| *H04L 43/08* | (2022.01) |
| *H04L 41/0677* | (2022.01) |
| *H04L 41/0213* | (2022.01) |

(52) U.S. Cl.
CPC ...... *H04L 41/0668* (2013.01); *H04L 41/0213* (2013.01); *H04L 41/0677* (2013.01); *H04L 43/08* (2013.01)

(58) Field of Classification Search
CPC ..... H04L 41/0213; H04L 41/0654–069; H04L 43/08; H04L 43/0811; H04L 43/12
See application file for complete search history.

(56) References Cited

U.S. PATENT DOCUMENTS

| | | | |
|---|---|---|---|
| 5,659,735 | A | 8/1997 | Parrish et al. |
| 6,601,234 | B1 | 7/2003 | Bowman-Amuah |
| 6,662,357 | B1 | 12/2003 | Bowman-Amuah |
| 6,971,093 | B1 | 11/2005 | Spring |

(Continued)

FOREIGN PATENT DOCUMENTS

| | | |
|---|---|---|
| CN | 102754075 A | 10/2012 |
| CN | 103999161 A | 8/2014 |
| WO | 2008/013897 A3 | 10/2008 |

OTHER PUBLICATIONS

Cederqvist et al., Version Management with CVS, Copyright 1992, http://cern-accelerators-optics.web.cern.ch/cern-accelerators-optics/CVS_Apache/cvs_manual.pdf, access on Oct. 1, 2014.

(Continued)

*Primary Examiner* — Pao Sinkantarakorn
(74) *Attorney, Agent, or Firm* — Invoke

(57) ABSTRACT

The embodiments disclosed herein relate to using SNMP functionality for fast and accurate detection of node failure in a computer cluster. When cluster nodes are connected via a switch that provides SNMP capability, a trap mechanism can be used to immediately and proactively notify cluster nodes that a particular cluster node is disconnected from the network, potentially even before the remaining cluster nodes have noticed a lack of response. In addition, when a cluster node notices a lack of response from a particular cluster node, the switch can be queried for link status and traffic information that can be used for fast determination of node status.

14 Claims, 7 Drawing Sheets

(56) References Cited

U.S. PATENT DOCUMENTS

| | | |
|---|---|---|
| 7,036,121 B1 | 4/2006 | Casabona et al. |
| 7,155,462 B1 | 12/2006 | Singh et al. |
| 7,213,232 B1 | 5/2007 | Knowles |
| 7,260,818 B1 | 8/2007 | Iterum et al. |
| 7,458,073 B1 | 11/2008 | Darling et al. |
| 7,546,595 B1 | 6/2009 | Wickham et al. |
| 7,624,377 B2 | 11/2009 | Wu |
| 7,707,550 B2 | 4/2010 | Resnick et al. |
| 7,827,547 B1 | 11/2010 | Sutherland et al. |
| 7,849,438 B1 | 12/2010 | Hemmat et al. |
| 7,890,941 B1 | 2/2011 | Garud et al. |
| 7,908,589 B2 | 3/2011 | Sattler et al. |
| 7,937,699 B2 | 5/2011 | Schneider |
| 8,082,406 B1 | 12/2011 | Singh et al. |
| 8,205,194 B2 | 6/2012 | Fries et al. |
| 8,219,653 B1 | 7/2012 | Keagy et al. |
| 8,245,219 B2 | 8/2012 | Agarwal et al. |
| 8,261,295 B1 | 9/2012 | Risbood et al. |
| 8,281,307 B2 | 10/2012 | Arnold et al. |
| 8,296,756 B1 | 10/2012 | Feeser et al. |
| 8,347,263 B1 | 1/2013 | Offer |
| 8,347,280 B2 | 1/2013 | Swarna |
| 8,365,164 B1 | 1/2013 | Morgenstern |
| 8,402,437 B2 | 3/2013 | Dhanakshirur et al. |
| 8,490,054 B2 | 7/2013 | Dattathreya |
| 8,572,566 B2 | 10/2013 | Gass et al. |
| 8,572,679 B1 | 10/2013 | Wang et al. |
| 8,595,714 B1 | 11/2013 | Hamer |
| 8,656,345 B2 | 2/2014 | Liang et al. |
| 8,667,465 B2 | 3/2014 | Poole |
| 8,762,945 B2 | 6/2014 | Arnold et al. |
| 8,762,980 B1 | 6/2014 | Sobel et al. |
| 8,843,914 B1 | 9/2014 | Klein et al. |
| 8,887,149 B2 | 11/2014 | Rogers et al. |
| 8,898,627 B2 | 11/2014 | Gass et al. |
| 8,997,041 B2 | 3/2015 | Lee et al. |
| 9,032,388 B1 | 5/2015 | Watson et al. |
| 9,043,788 B2 | 5/2015 | Garrett et al. |
| 9,116,767 B1 | 8/2015 | Arif et al. |
| 9,158,526 B1 | 10/2015 | Nguyen |
| 9,176,728 B1 | 11/2015 | Dixit et al. |
| 9,250,889 B2 | 2/2016 | Bennah et al. |
| 2003/0088428 A1 | 5/2003 | Singhal |
| 2003/0233385 A1 | 12/2003 | Srinivasa et al. |
| 2004/0034850 A1 | 2/2004 | Burkhardt et al. |
| 2004/0044996 A1 | 3/2004 | Atallah |
| 2004/0210653 A1 | 10/2004 | Kanoor et al. |
| 2004/0243995 A1 | 12/2004 | Sheehy |
| 2004/0243996 A1 | 12/2004 | Sheehy et al. |
| 2005/0044057 A1 | 2/2005 | Bluvshteyn et al. |
| 2006/0080656 A1 | 4/2006 | Cain et al. |
| 2006/0150176 A1 | 7/2006 | Dorricott et al. |
| 2006/0173993 A1 | 8/2006 | Henseler et al. |
| 2006/0174238 A1 | 8/2006 | Henseler et al. |
| 2006/0259272 A1 | 11/2006 | Sattler et al. |
| 2007/0041328 A1 | 2/2007 | Bell, IV |
| 2007/0113066 A1 | 5/2007 | Samba et al. |
| 2007/0169080 A1 | 7/2007 | Friedman |
| 2007/0220507 A1 | 9/2007 | Back et al. |
| 2007/0220510 A1 | 9/2007 | Bell et al. |
| 2008/0109801 A1 | 5/2008 | Levine et al. |
| 2008/0120479 A1 | 5/2008 | Dick et al. |
| 2008/0134175 A1 | 6/2008 | Fitzgerald et al. |
| 2008/0244028 A1 | 10/2008 | Le et al. |
| 2009/0007105 A1 | 1/2009 | Fries et al. |
| 2009/0064122 A1 | 3/2009 | Bielski |
| 2009/0064127 A1 | 3/2009 | Schneider |
| 2009/0144730 A1 | 6/2009 | Chen et al. |
| 2009/0187610 A1 | 7/2009 | Guo |
| 2009/0193057 A1 | 7/2009 | Maes |
| 2009/0240791 A1 | 9/2009 | Sakurai et al. |
| 2009/0265699 A1 | 10/2009 | Toeroe |
| 2009/0307685 A1 | 12/2009 | Axnix et al. |
| 2010/0017794 A1 | 1/2010 | Waters et al. |
| 2010/0162036 A1 | 6/2010 | Linden et al. |
| 2010/0169874 A1 | 7/2010 | Izard et al. |
| 2010/0218176 A1 | 8/2010 | Spanner et al. |
| 2010/0242037 A1 | 9/2010 | Xie et al. |
| 2011/0029963 A1 | 2/2011 | Smith et al. |
| 2011/0138461 A1 | 6/2011 | Bhargava et al. |
| 2011/0145790 A1 | 6/2011 | Rajaraman et al. |
| 2011/0225275 A1 | 9/2011 | Shah et al. |
| 2011/0265077 A1 | 10/2011 | Collison et al. |
| 2011/0302573 A1 | 12/2011 | Bubolz et al. |
| 2012/0079471 A1 | 3/2012 | Vidal et al. |
| 2012/0084752 A1 | 4/2012 | Arnold et al. |
| 2012/0180024 A1 | 7/2012 | Gonzalez et al. |
| 2012/0311345 A1 | 12/2012 | Dhuse et al. |
| 2013/0054639 A1 | 2/2013 | Sharma et al. |
| 2013/0067451 A1 | 3/2013 | Hussain et al. |
| 2013/0080761 A1 | 3/2013 | Garrett et al. |
| 2013/0091498 A1 | 4/2013 | Arcese et al. |
| 2013/0139139 A1 | 5/2013 | Mallur et al. |
| 2013/0212573 A1 | 8/2013 | Archer et al. |
| 2013/0274006 A1 | 10/2013 | Hudlow et al. |
| 2013/0275376 A1 | 10/2013 | Hudlow et al. |
| 2013/0297579 A1 | 11/2013 | Andrew et al. |
| 2013/0305239 A1 | 11/2013 | Traut et al. |
| 2013/0347118 A1 | 12/2013 | Yi et al. |
| 2014/0047436 A1 | 2/2014 | Jayachandran et al. |
| 2014/0053147 A1 | 2/2014 | Wang et al. |
| 2014/0101431 A1 | 4/2014 | Bennah et al. |
| 2014/0108774 A1 | 4/2014 | Bennah et al. |
| 2014/0108779 A1 | 4/2014 | Bennah et al. |
| 2014/0122666 A1 | 5/2014 | Malhotra et al. |
| 2014/0122862 A1 | 5/2014 | Ludwig et al. |
| 2014/0157262 A1 | 6/2014 | Hicks et al. |
| 2014/0173578 A1 | 6/2014 | Ku et al. |
| 2014/0195844 A1 | 7/2014 | Laval et al. |
| 2014/0279985 A1 | 9/2014 | Fontenot et al. |
| 2014/0282413 A1 | 9/2014 | Grimme et al. |
| 2014/0282459 A1 | 9/2014 | Hey et al. |
| 2014/0325498 A1 | 10/2014 | Sirois et al. |
| 2015/0012914 A1 | 1/2015 | Klein et al. |
| 2015/0095468 A1 | 4/2015 | Benny et al. |
| 2015/0106810 A1 | 4/2015 | Ciano et al. |
| 2015/0113516 A1 | 4/2015 | Bennah et al. |
| 2015/0169311 A1 | 6/2015 | Dickerson et al. |
| 2015/0199191 A1 | 7/2015 | Bhasin et al. |
| 2015/0199197 A1 | 7/2015 | Maes et al. |
| 2015/0324182 A1 | 11/2015 | Barros et al. |
| 2015/0347119 A1 | 12/2015 | Wang et al. |
| 2016/0048383 A1 | 2/2016 | Nachimuthu et al. |
| 2016/0092188 A1 | 3/2016 | Kuchibhotla et al. |
| 2016/0267273 A1 | 9/2016 | Sugawara |
| 2016/0371105 A1 | 12/2016 | Sieffert et al. |
| 2018/0091586 A1* | 3/2018 | Auradkar ............ H04L 67/1095 |

OTHER PUBLICATIONS

Conradi et al, "Version Models for Software Configuration Management", ACM Computing Surveys, vol. 30, No. 2, , pp. 232-282, 1998.

Dearle, "Software Deployment, Past, Present and Future," 2007, Proceeding FOSE '07 2007 Future of Software Engineering, pp. 269-284.

Diaz, "Implementing Faceted Classification for Software Reuse" Communications of the ACM, vol. 34, No. 5, pp. 88-97, 1991.

Dunagan et al., "Towards a self-managing software patching process using black-box persistent-state manifests," 2004, Proceedings. International Conference on Autonomic Computing, pp. 1-8, downloaded from the Internet at <url>:https://ieeexplore. IEEE.org.

ELF-64 Object File Format, Version 1.4, May 20, 1997, http://h21007.www2.hp.com/portal/download/files/prot/files/STK/pdfs/elf- 64-hp-pdf, accessed on Oct. 1, 2014.

Faulkes et al, "Software Configuration Management and Its Contribution to Reliability Program Management", IEEE Transactions on Reliability, vol. R-32, No. 3, pp. 289-292, 1983.

Filepp et al., "Image selection as a service for cloud computing environments," 2010, IEEE International Conference on Service-Oriented Computing and Applications (SOCA), pp. 1-8.

(56) References Cited

OTHER PUBLICATIONS

Gerace et al., "The challenges and successes of implementing an enterprise patch management solution," 2004, Proceeding SIGUCCS '04 Proceedings of the 32nd annual ACM SIGUCCS conference on User services, pp. 30-33.
Hall et al., "A cooperative approach to support software deployment using the Software Dock," 1999, Proceedings of the 1999 International Conference on Software Engineering, pp. 174-183.
Isard et al., "Autopilot automatic data center management," 2007, ACM SIGOPS Operating Systems Review—Systems work at Microsoft Research, vol. 41, Issue 2, pp. 60-67, downloaded from the Internet at <url>:https://dl.acm.org.
Kwok et al., "A Software as a Service with Multi-tenancy Support for an Electronic Contract Management Application," 2008, IEEE International Conference on Services Computing, pp. 179-186.
Madhavan et al, "Predicting Buggy Changes Inside an Integrated Development Environment", ACM, pp. 36-40, 2007.
Oracle, Creating and Configuring Oracle Virtual Directory Adapters, 2011.
Ping et al,"A Change-Oriented Conceptual Framework of Software Configuration Management", IEEE, pp. 1-4, 2007.
Remote Network Monitoring Charter, IETF, Mar. 24, 2006.
RFC 1065, Structure and Identification of Management Information for TCP/IP-based internets, Aug. 1988.
RFC 1066, Management Information Base for Network Management of TCP/IP-based internets, Aug. 1988.
RFC 1067, A Simple Network Management Protocol, Aug. 1988.
RFC 1213, Management Information Base for Network Management of TCP/IP-based internets: MIB-II, Mar. 1991.
RFC 1441, Introduction to version 2 of the Internet-standard Network Management Framework, Apr. 1993.
RFC 1452, Coexistence between version 1 and version 2 of the Internet-standard Network Management Framework, Apr. 1993.
RFC 1573, Evolution of the Interfaces Group of MIB-II, Jan. 1994.
RFC 1757, Remote Network Monitoring Management Information Base, Feb. 1995.
RFC 1909, An Administrative Infrastructure for SNMPv2, Feb. 1996.
RFC 1910, User-based Security Model for SNMPv2, Feb. 1996.
RFC 2021, Remote Network Monitoring Management Information Base Version 2 using SMIv2, Jan. 1997.
Satyanarayanan, "Software image management for large networks," 2002, IEEE Workshop on IP Operations and Management, pp. 217-221.
Sotomayer et al., "Virtual Infrastructure Management in Private and Hybrid Clouds," 2009, IEEE Internet Computing, vol. 13, Issue 5, pp. 14-22.
Stuckenholz, Component Evolution and Versioning State of the Art, ACM SIGSOFT Software Engineering Notes, vol. 30, No. 1, Jan. 2005.
Van der Hoek, "Configurable software architecture in support of configuration management and software deployment," 1999,Proceedings of the 1999 International Conference on Software Engineering, pp. 732-733, downloaded from the Internet at <url>:https://ieeexplore. ieee.org.
Yao et al, "Towards a Semantic-based Approach for Software Reusable Component Classification and Retrieval", ACM, pp. 110-115, 2004.

* cited by examiner

DETERMINING THE HEALTH OF OTHER NODES IN A SAME CLUSTER BASED ON PHYSICAL LINK INFORMATION

INCORPORATION BY REFERENCE; DISCLAIMER

The following application is hereby incorporated by reference: application Ser. No. 16/125,992 filed on Sep. 10, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to detecting node failure in a node cluster. More specifically, the disclosure relates for identifying node failure based on physical link information.

BACKGROUND

A computer cluster includes two or more cluster nodes. Each cluster node is a computer host on which cluster software is installed and executed. Each node performs a common set of tasks, which may be controlled and scheduled by software. Nodes in the cluster work cooperatively with each other and may be viewed as a single system. Working together requires consensus among the nodes, making it important for each node to have accurate knowledge of the other nodes in the cluster. One common task that each node performs is determining which nodes are currently active. When a node stops responding, each other node comes to recognize that the failed node is no longer in the cluster.

One mechanism for detecting a cluster node failure relies on sending a heartbeat message to other nodes in the cluster. A lack of a response from a node to the heartbeat message within an established timeout period may lead to the conclusion that the node has failed. Another heartbeat-based variant mechanism sets the timeout period to be a function of prior responses (aka Adaptive Failure Detectors) rather than a fixed timeout value.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
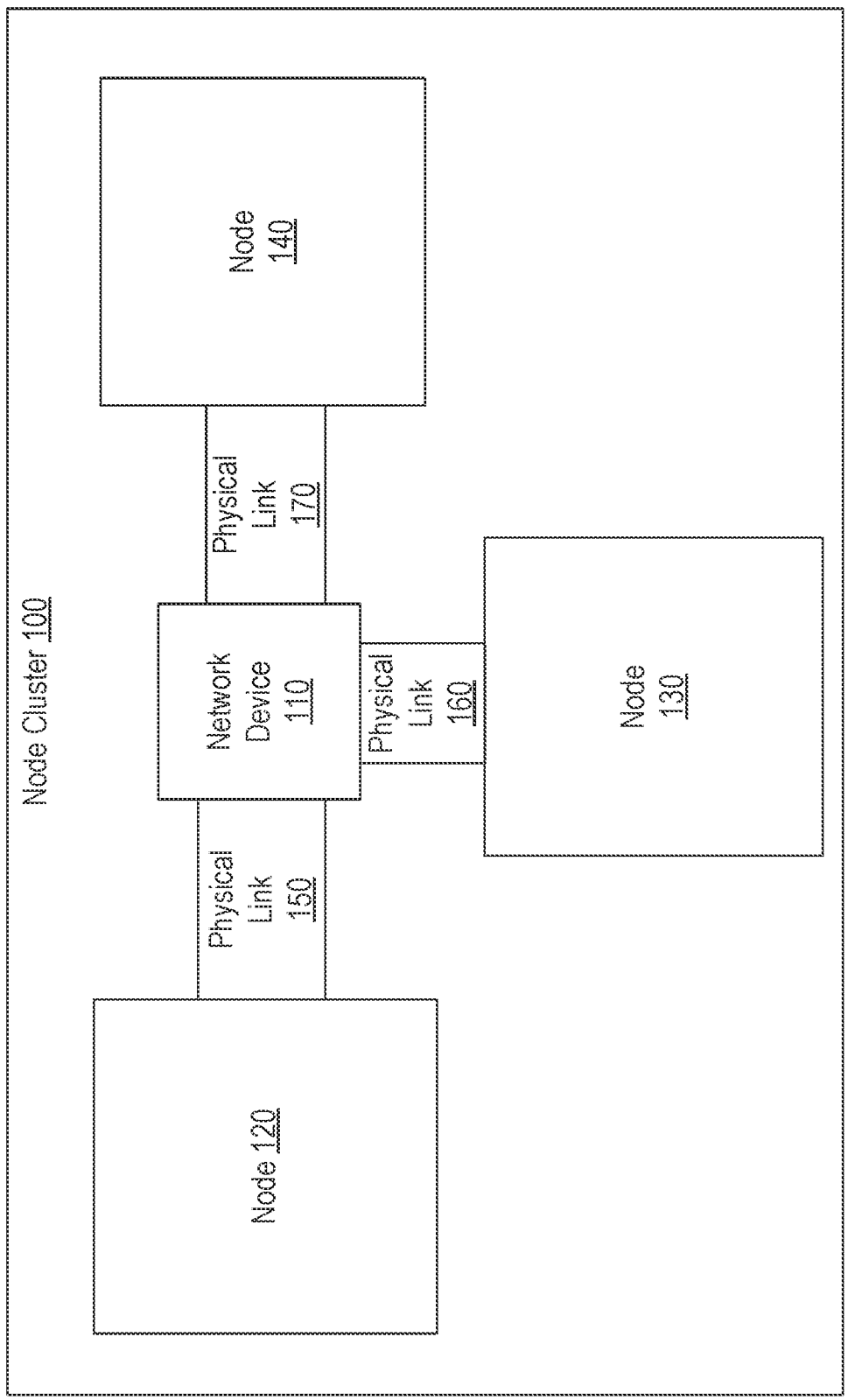
FIG. 1 is a block diagram that illustrates components of the system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

The problem of cluster node failure detection is one of the most critical issues to be addressed in cluster computing. Concluding that a node has failed and should be removed from the cluster may include two steps: (a) detecting anomalous node behavior and (b) verifying that the node is really dead and not just temporarily unresponsive. Because legitimate reasons can delay a node from performing certain tasks, such as executing a very large query, it is important to verify that a detected anomaly results from a hard systemic failure and not a transient recoverable error.

The cost of removing a node from a cluster includes at least diminished remaining compute capacity for the cluster. In addition, clients that were connected to the removed node may lose work-in-progress, need to reconnect to another node, and perform recovery. Thus, if a decision to remove a node is made too quickly, the decision may be inaccurate. Deciding to remove a cluster node based on a false-positive failure detection incurs this unnecessary cost.

Conversely, there is a cost associated with delaying a decision to evict a node that has permanently failed. Waiting too long to evict a failed node can cause the entire cluster to freeze and applications running on the cluster to hang. The cluster requires consensus among nodes to operate properly. While the cluster nodes try to validate that another node has failed and should be evicted, cluster operation may halt waiting for a response from the failed node. In a clustered database application, for example, no transactions can commit. To increase accuracy, known methods use a time-consuming mechanism to gather sufficient verification information, which slows the node eviction process. Thus, the decision to remove a node from a cluster needs to be both accurate and fast. However, known methods for node failure detection trade off accuracy and speed.

One method of node failure detection involves a monitoring node sending a heartbeat health message to a target node, which responds to the heartbeat health message. If the response from the target node is received by the monitoring node within a timeout interval (i.e. before a timeout), then the target node is believed to be up and participating in the cluster. If no response is received from the target node before the timeout, then the target node's health is suspect, but further evidence is required to rule out a temporary issue that might resolve itself. The heartbeat-based mechanisms are directed to determining how to establish an optimal combination of (a) the amount of time to wait for a response to heartbeat message from a target node in which the first missed heartbeat response detects that the target node is potentially down (the timeout) and (b) a number of missed heartbeats to verify that the node is down. The first missed response to a heartbeat message from the target node may identify anomalous behavior. To avoid a premature eviction of the target node, the monitoring node may retry the heartbeat a number of times, and when the count of missing heartbeat responses reaches a pre-defined maximum value, the monitoring node may conclude that there is a systemic problem.

Detecting a single missing heartbeat response is not an accurate way to determine node failure. Lengthening the timeout period may reduce inaccuracy, but as the timeout period is increased, so is the time when the cluster may freeze if the target node is really down or inaccessible. In addition, each time the heartbeat is retried, the monitoring node waits for the timeout interval to expire before proceeding.

1. General Overview

One or more embodiments include at least one cluster node determining the health of a target cluster node that is in a same cluster based on the characteristics of a physical link between the target cluster node and a network device. If a target cluster node within a cluster is no longer connected to or responsive on a corresponding network device port, then the target cluster node may be classified as a failed node and evicted from the cluster. If an amount of data received on a network device port connected to a target cluster node falls below a threshold value, then the target cluster node may be classified as a failed node and evicted from the cluster. Any of the other nodes in the same cluster may begin the eviction process of the target cluster node.

In an example, cluster nodes are connected via a Simple Network Management Protocol (SNMP)-enabled switch, or a switch providing functionality comparable to SNMP as described herein, information about communication with nodes in the cluster can be obtained directly from the switch. The communication information can help determine whether a node is still an active member of the cluster. SNMP is an Internet Standard protocol that collects and organizes information about managed devices on IP networks.

When a device is disconnected from a switch port, or the port itself goes down, there is an electrical disruption that is immediately physically detectable. Using SNMP, this port status information may be provided to cluster nodes as an indication of status of the cluster node that was connected to a particular switch port. Upon receiving a link down status from the switch, a monitoring node may conclude, without needing to gather other corroborative evidence, that the target node connected to the down port should be removed from the list of nodes in the cluster.

In another embodiment, a heartbeat mechanism for detecting node failure may be supplemented with SNMP capability. Specifically, a monitoring node may identify anomalous behavior in a target node when the monitoring node fails to receive a response to a heartbeat message before the end of a timeout period. Instead of retrying heartbeats to verify that a node has failed, the switch may quickly and accurately provide information to verify the node status. In response to receiving a query for the status of a physical link, the switch may provide a link up or link down indication. If the link is down, the monitoring node may conclude with high probability that the target node is not available to participate in cluster tasks, and the monitoring node may share this information with other nodes in a consensus-based node eviction process. If the link is up, then traffic statistics provided by the switch may indicate how much data was transmitted by and received from the target node over the link during a certain interval of time. If the link is up but no traffic is sent and received, the node may be hung.

Some embodiments described in this Specification and/or recited in the claims may not be included in this General Overview section.

2. System Components

FIG. 1 is a block diagram that illustrates components of the system, in accordance with one or more embodiments. Components may be added, removed, modified, or combined. Functionality described in relation to one component may instead be implemented by another component. Accordingly, the specific components illustrated and/or described herein should not be construed as limiting the scope of any of the claims.

Node Cluster 100 comprises a three-node cluster including Node 120, Node 130, and Node 140 communicating with each other through Network Device 110. Node 120 is physically connected to network device 110 by physical link 150; node 130 is physically connected to network device 110 by physical link 160; and node 140 is physically connected to network device 110 by physical link 160. Nodes 120, 130, and 140 may be computer hosts that run clustering software. The software causes the computer hosts to operate collaboratively and to be viewed as a single system. Working together requires consensus among cooperating nodes, making it important for each node to have accurate knowledge of the other nodes in the cluster. Each node performs a same set of tasks, which may be controlled and scheduled by software. One task that each node performs is identifying and monitoring the status of other nodes in the cluster. When a node stops responding, other nodes may determine that the failed node is no longer in the cluster.

In an embodiment, network device 110 is a switch and physical links 150, 160, and 170 are directly connected to distinct ports on the switch. In an embodiment, network device 110 receives subscription requests from compute nodes that request receipt of an event notification if the network device 110 detects that a particular physical link has failed. When the physical link goes down, the node connected to the link cannot communicate with the rest of the cluster. A hardware interrupt caused by a physical link failure may cause the switch to send an event notification to the set of cluster nodes that have subscribed to the specific physical link failure. In an embodiment, network device 110 also receives requests for status information for a particular physical link. The status information may be an indication of the link being up (operational) or down (non-operational). The status information may also include statistical information regarding the amount of traffic that has been send/received over the physical link.

Figure 2:
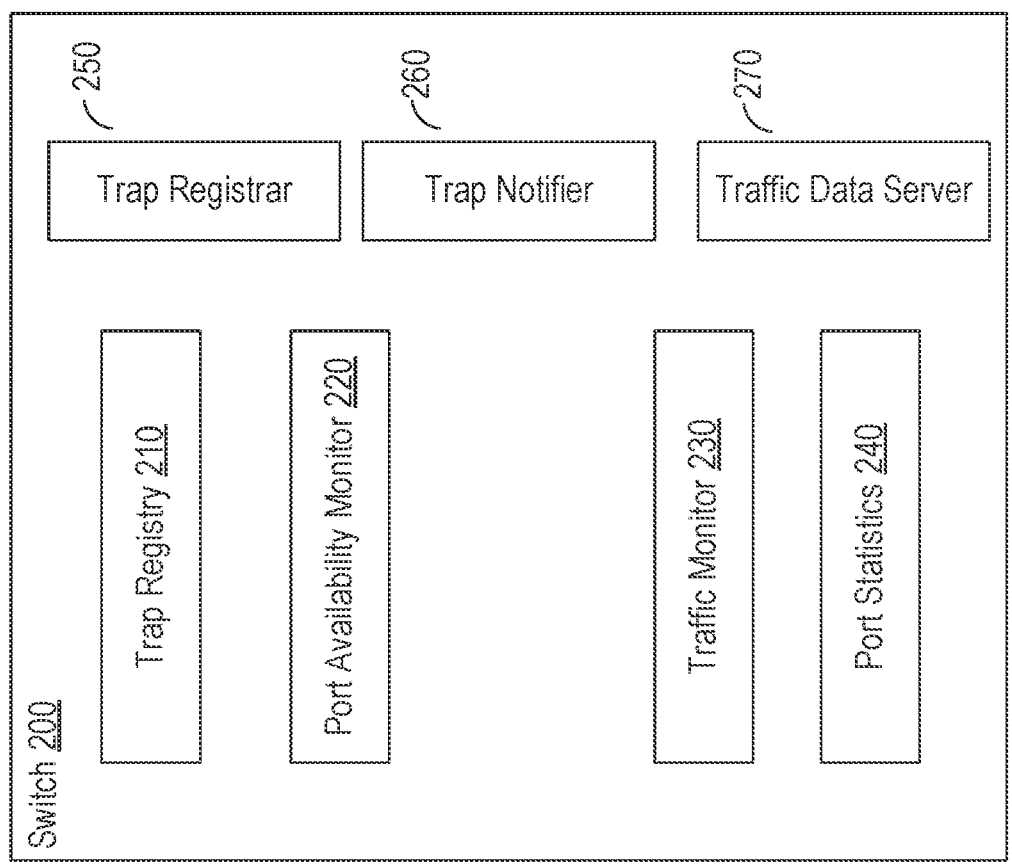
FIG. 2 is a block diagram that illustrates components of an example SNMP-enabled switch, in accordance with one or more embodiments.

FIG. 2 is a block diagram that illustrates components of a network device, in accordance with one or more embodiments. Components may be added, removed, modified, or combined. Functionality described in relation to one component may instead be implemented by another component. Accordingly, the specific components illustrated and/or described herein should not be construed as limiting the scope of any of the claims.

Network device 110 is embodied in FIG. 2 as Switch 200. Switch 200 may respond to requests for status of the switch ports. In an embodiment, the switch comprises components Trap Registrar 250, Trap Notifier 260, Traffic Data Server 270, Trap Registry 210, Port Availability Monitor 220, Traffic Monitor 230, and Port Statistics 240.

Trap registrar 250 may receive subscription requests from a monitoring cluster node. The trap registrar 250 may record the subscription in trap registry 210 that may be stored in a portion of memory on the switch.

Port availability monitor 220 monitors the port status for the switch ports. If a port is detected to be non-operational (down), then trap notifier 260 may send a trap notification to monitoring nodes that are in the trap registry as interested in receiving an event notification.

Traffic data server 270 may receive requests for certain traffic flow data on a particular switch port. Traffic Monitor 230 stores traffic data statistic information in Port Statistic 240 which may be stored in a portion of memory on the switch.

3. Process Description

The clustering software running on each of the cluster nodes maintains a list of other nodes in the cluster. In an embodiment, the list of nodes includes all other nodes in the cluster. In another embodiment, each node may maintain a list comprising a subset of the active nodes in the cluster. The clustering software on a cluster node verifies that every node on the list is an active member of the cluster. When the clustering software discovers a node that is no longer active in the cluster, such a node is removed from the list. Determining that a node is no longer in the cluster may be based on observing that the node is unresponsive. The techniques described herein are directed to a fast and accurate way to determine when a node has left the cluster. These techniques may be useful independent of how the cluster software responds to learning that a node has left the cluster.

Figure 3:
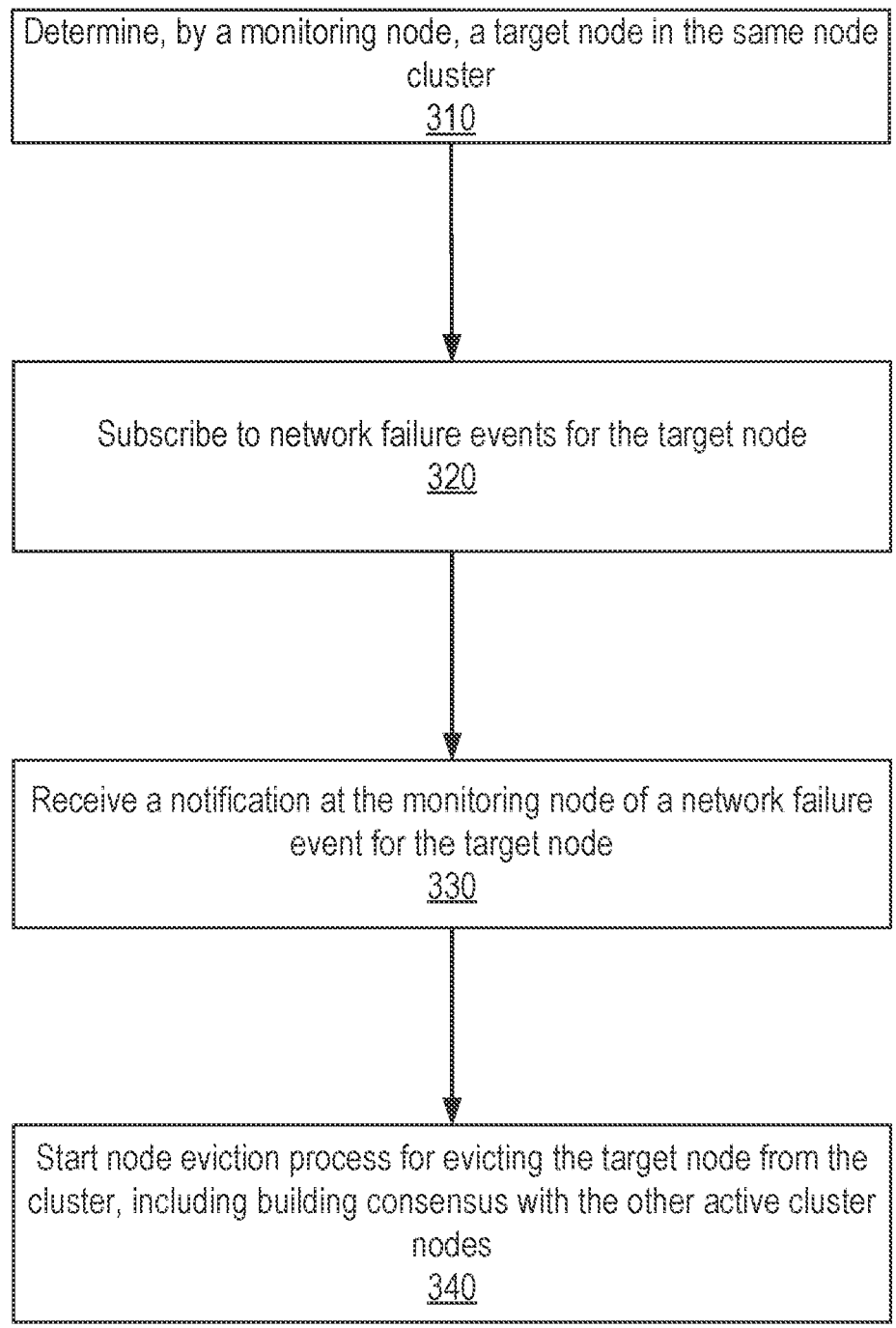
FIG. 3 is a flow diagram that illustrates a trap-based detection mechanism for detecting node failure, in accordance with one or more embodiments.

FIG. 3 is a flow diagram that illustrates a trap-based detection mechanism for detecting node failure, in accordance with one or more embodiments. Operations described herein, with reference to FIG. 3, may be omitted, modified, or rearranged. Operations not illustrated in FIG. 3 may be performed instead of or in addition to the illustrated operations. Accordingly, the operations as described herein should not be construed to limit the scope of any of the claims.

FIG. 3 presents operations performed by a monitoring node interacting with network device 110 in the computer cluster to determine the status of a particular target node. To communicate with network device 110, the monitoring node may be configured with the address of network device 110 or the monitoring node may discover the location of the network device 110 at run time. The operations are performed to determine whether the target node belongs on the active node list for the cluster. While the operations reference a single monitoring node and a single target node for purposes of clarity, any and all of the nodes may perform these same operations. Furthermore, a monitoring node may monitor any number of target nodes in the same cluster. In Operation 310, a monitoring node selects a target node from a list of active cluster nodes. In Operation 320, the monitoring node is subscribed to network failure events for the target node. In an embodiment, the monitoring node itself sends a message to network device 110 requesting to be notified as the monitoring node if network device 110 detects a failure in the physical link to which the target node is connected. In an alternate embodiment, a node may register/subscribe another node as the monitoring node to receive failure notifications upon detecting a failure with the target node. For example, when a node joins the cluster and establishes a list of other nodes in the cluster, the new node may subscribe the other nodes in the list to its own failures.

The network device 110 may maintain a subscription table that associates the monitoring node with the target node and/or the physical link connected to the target node.

When network device 110 detects a failure in a physical link, the network device may determine that there is a subscription for notification of the failed physical link and may send an event notification to the subscribed monitoring node. The monitoring node receives the event notification from network device 110 for the failed physical link in Operation 330.

In an alternative embodiment, network device 110 may associate each physical link with a set of physical links that are connected to nodes belonging to the same cluster. When one of the physical links in the set fails, network device 110 may send a link failure notification to nodes connected to the other physical links in the set.

In Operation 340, the monitoring node may start a task for removing, from the cluster, the compute node connected to the failed physical link. The task for removing a node from a cluster requires consensus with at least a portion of the other nodes. A person of skill in the art would understand that there are a variety of known ways that consensus can be achieved, and a node removed from a cluster once a monitoring node detects that a target node is down. For example, one of the remaining active cluster nodes may be elected as a master cluster node that may update the list of currently active node and inform the evicted node that the evicted node is no longer in the cluster, perhaps through a shared memory channel.

This proactive event notification mechanism provided by the network device may coexist with, and independent of, other known ways for cluster nodes to detect node failure. However, receiving an event notification is a direct and immediate way to confirm node failure in a single step.

Figure 4:
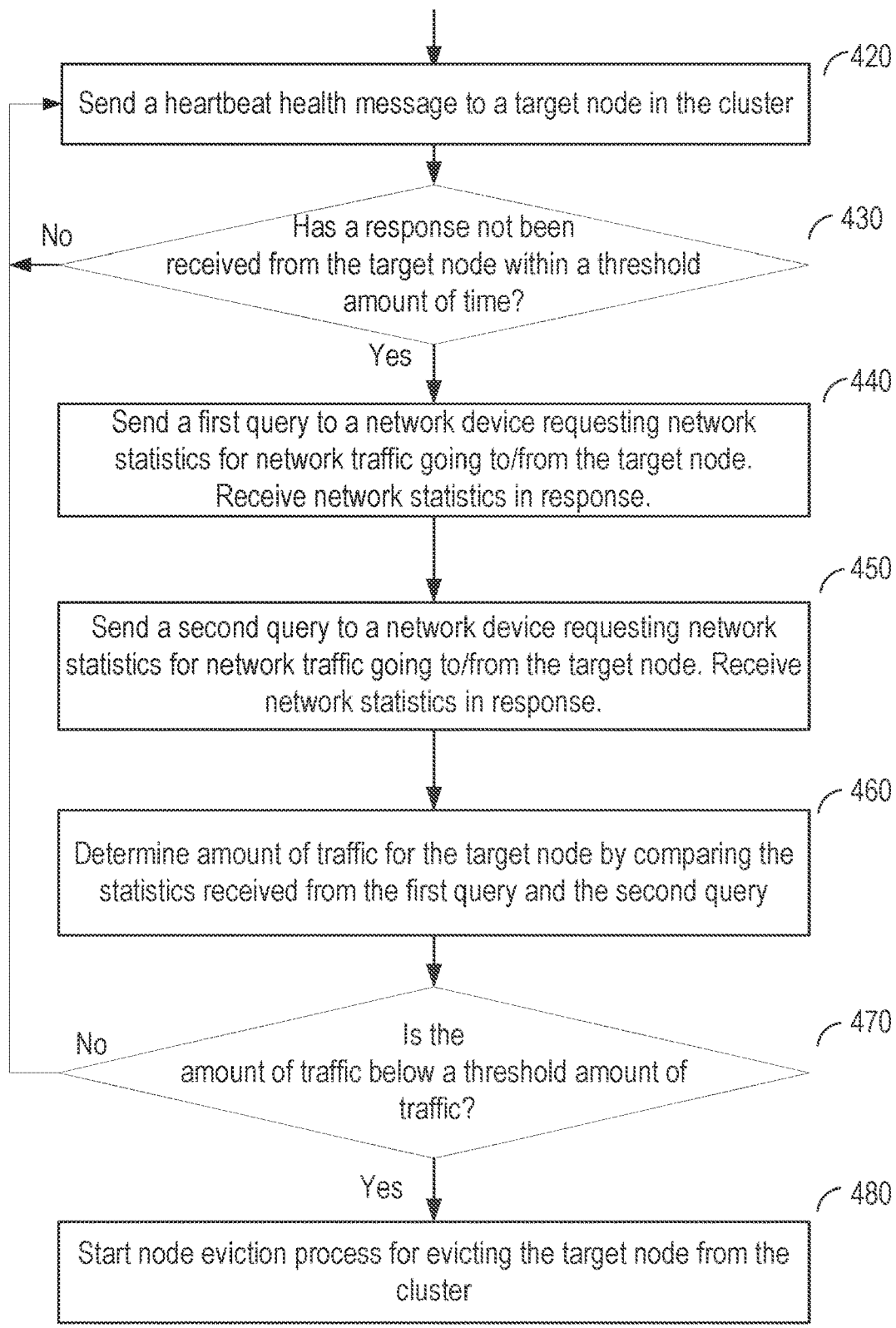
FIG. 4 is a flow diagram that illustrates a heartbeat-based mechanism for detecting node failure, in accordance with one or more embodiments.

FIG. 4 is a flow diagram that illustrates a heartbeat-based mechanism for detecting node failure, in accordance with one or more embodiments. Operations described herein, with reference to FIG. 3, may be omitted, modified, or rearranged. Operations not illustrated in FIG. 3 may be performed instead of or in addition to the illustrated operations. Accordingly, the operations as described herein should not be construed to limit the scope of any of the claims.

A common way of monitoring the health of nodes in a compute cluster is to send heartbeat messages between pairs of nodes. The sender of the heartbeat message (i.e., monitoring node) monitors the health of the heartbeat message receiver (i.e., target node). If the monitoring node does not receive a response back from the target node within a certain timeout interval, the monitoring node may take further steps to determine whether the unresponsive node is down or just temporarily delayed. The flow illustrated in FIG. 4 provides a fast and accurate way to determine whether to start an eviction process of the target node.

The flow is performed from the perspective of a monitoring node monitoring a particular target node. In Operation 420, the monitoring node sends a heartbeat health message to the target node. If responses are received back from the target node in a timely manner, then the monitoring node again sends heartbeat messages after waiting for some time interval. However, if in Operation 430 the monitoring node has not received a response back from the target node within a threshold amount of time, then the flow proceeds to Operation 440. A person of skill in the art will appreciate that there are a variety of ways to determine the threshold amount of time to wait for a response including static configuration and dynamic determination at runtime. Any such determination of the timeout interval may be compatible with the flow of FIG. 4.

Alternative methods for detecting anomalous behavior may be used instead of or in addition to a heartbeat protocol. For example, cluster nodes processing data in a pipeline configuration may notice that no work is being delivered from upstream. For example, if cooperating nodes partition shared memory (or shared storage) such that a certain node is expected to write data into a particular portion of the memory, then lack of expected data written to that portion of memory may indicate a problem with the node. In general, communication between nodes that use shared memory or shared storage rather than the network may be used to observe artifacts of a node's functioning.

Regardless of whichever triggering event raises suspicion about a node's heath, the triggering event may be followed up by querying the switch for more direct and immediate information about the status of the node. The switch may even be queried periodically or otherwise, without detection of any triggering event. In Operation 440, the monitoring node may request status information about the target node. More specifically, the network device may provide information on the physical link connected to the target node such as whether the link is operational and how much traffic has traversed the link. As an example, the network statistics received in response to the first query may indicate 0.3 gigabytes of traffic has been received over the link. In an embodiment, the traffic statistics returned to the monitoring node from the network device may not have meaning in isolation. To determine the amount of traffic flowing over the physical link, in Operation 450, the monitoring node may wait a certain interval, then issue a second query to the network device for determining how much traffic has traversed the link. In Operation 460, the difference in the statistics returned in the second response as compared to the first response is calculated to provide an indication of how much traffic traversed the physical link during the certain time interval. As an example, at time t1 the network device may indicate that 30.5 MB of traffic has been received from the target node over the physical link. At time t2, which is 5 seconds after t1, the network device may indicate that 35.2 MB of traffic has been received from the target node over the physical link. Subtracting the two statistics resulting in determining a rate of 4.7 MB/5 seconds.

In an embodiment, operations 440-460 may be replaced with a single operation to receive traffic statistics per interval as computed by the network device. For example, the network device may maintain a log of traffic received from the target node during each interval (e.g., traffic received each second over the last ten minutes). When queried, the network device may compute the rate of traffic over the last n seconds and return a single value back to the monitoring node. The value represents a rate of traffic over a recent time interval rather than a total amount of traffic transmitted to and/or received from the target node.

In Operation 470, the amount of traffic that traversed the physical link during the certain time interval may be compared against one or more thresholds. A deviation from an expected amount of traffic may raise an alert. For example, if no traffic has traversed the link during the interval, but the link is operational, the target node may be hung. A hung node is not available to participate in the cluster. If the amount of traffic represents an anomaly for the target node, then in Operation 480, the monitoring node may initiate an eviction process for the target node.

4. Using SNMP for Fast Decision Making

As explained above, the capabilities of the switch that provide fast detection of a failed node may be provided by an implementation of SNMP (Simple Network Management Protocol). SNMP is part of the TCP/IP protocol suite. SNMP facilitates the exchange of management information between network devices. An SNMP Management Information Base (MIB) specifies for a particular kind of network device what information is available and how to reference the information. Devices that typically support SNMP include cable modems, routers, switches, servers, workstations, printers, and more. A MIB specifies the management data of a specific subsystem of an SNMP-enabled device, using a hierarchical namespace. Each entry in a MIB is identified by an object identifier (OID). This model permits management across all layers of the OSI reference model. An SNMP enabled switch provides data in response to a request for data defined by the SNMP MIB. For example, in Operation 440 of FIG. 4, the query to the switch may include the OID that represents traffic data for a particular switch port. The data provided by the switch may help identify the problems from switch port, cable and computing node in a SNMP-enabled environment. An SNMP implementation may make available critical data for improving the accuracy of decision making in a cluster eviction algorithm, and eventually speed-up the node eviction decision-making.

An SNMP-enabled switch maintains a table that maps each switch port to the device connected to the switch port. The port/device mapping table can be used to discover which switch port provides the physical link that connects a particular device to the network. The switch can respond to queries for status of a physical link that corresponds to a cluster node. The response from the switch may be used to determine whether the cluster node has network connectivity.

SNMP also provides an event-driven mechanism. This capability allows a switch to proactively notify a previously registered node that a failure has occurred without requiring the node to poll for such information. Detection and notification of an event for which there is registered interest is referred to as a "trap". For example, RFC1573/1213 provide some useful snmpTraps, such as the linkDown/linkup snmpTrap (OID 1.3.6.1.2.1.31.1.1.1.14). The linkDown/linkup snmp Trap may indicate that there is a change in the status of a switch port. As in Operation 320 of FIG. 3, a monitoring node may request that the switch send the monitoring node an SNMP linkDown trap notification whenever a specified switch port changes state from up to down or from down to up. When a switch port changes state, the connectivity of the compute node to the rest of the cluster changes as a result. As in Operation 330 of FIG. 3, the switch may send an SNMP linkDown trap notification when a switch port state change is detected. This is a very direct and immediate way to find out that a cluster node has lost or regained connectivity.

One important addition to the basic set of SNMP standards (SMI, MIB, SNMP) is the RMON (Remote MONitor) specification. RMON defines a remote monitoring MIB that supplements MIB-II and provides a network manager with vital information about the interconnect network and host node. RMON provides standard functions in most router and switch devices. The RMON MIB includes OIDs that provide statistics data for a specified switch port. For example, some useful statistics provided by the RMON MIB include counters for the number of unicast, multicast, and broadcast packets received and the number of unicast, multicast, and broadcast packets sent through the switch port. In addition, the MIB provides a counter for the total number of octets received and another counter for the total number of octets sent. The values for counters of total octets received from and transmitted out of an interface are important for determining whether the interface is hung or slow. For example, if the switch port is known to be up but little or no traffic is transmitted or received, the device connected to the port is unable to process network packets, indicating that the node, not the network, is the problem.

5. Example

Figure 5:
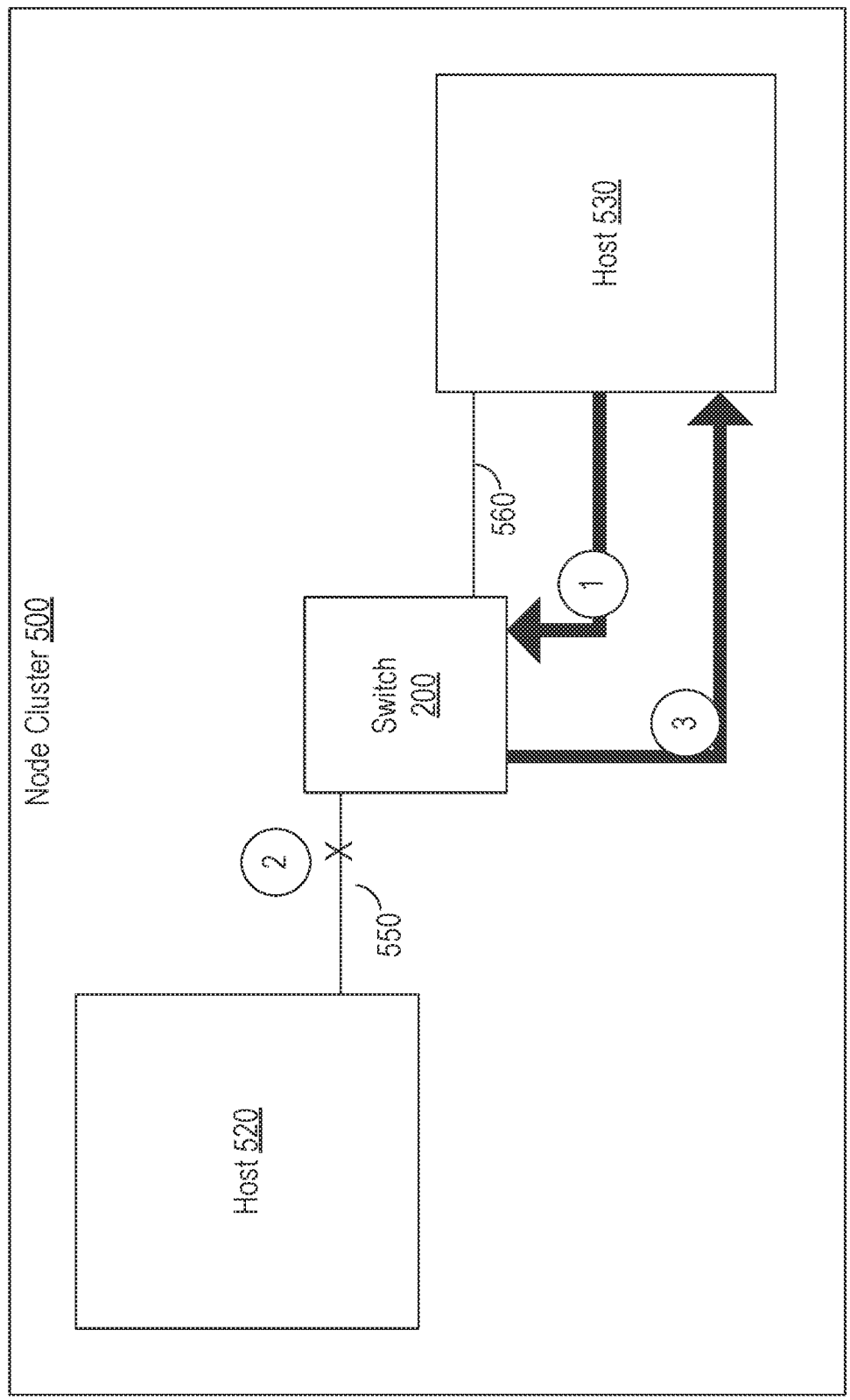
FIG. 5 is a block diagram that illustrates an example system using trap-based node failure detection, in accordance with one or more embodiments.

FIG. 5 is a block diagram that illustrates an example system using trap-based node failure detection, in accordance with one or more embodiments. Operations not illustrated in FIG. 5 may be performed instead of or in addition to the illustrated operations. Accordingly, the operations as described herein should not be construed to limit the scope of any of the claims.

Figure 6:
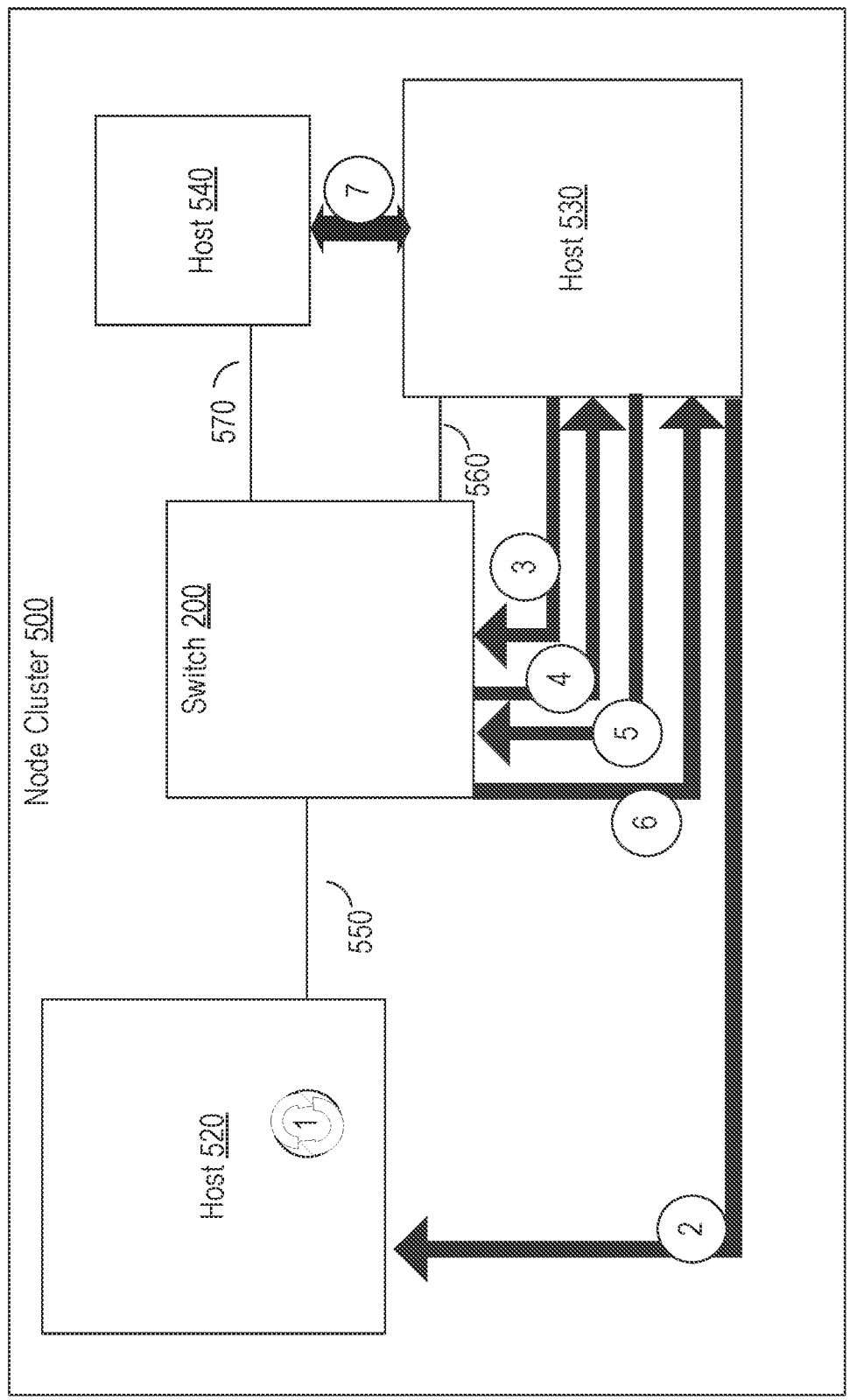
FIG. 6 is a block diagram that illustrates an example system using heartbeat-based node failure detection, in accordance with one or more embodiments.

In an embodiment, Switch 200 may be an SNMP-Enabled switch. Host 530 and Host 520 are cluster nodes within Node Cluster 500. Host 530 monitors the status of Host 520. Host 530 is connected to switch 200 (switch) by physical link 560 and Host 520 is connected to switch 200 by physical link 550. In FIGS. 5 and 6, the solid black arrows are logical operations occurring in numbered sequence. All communication between a host and the switch, represented by the logical operations, traverses a physical link. At time 1, Host 530 subscribes to communication failure with Host 520. In an embodiment, Host 530 has previously queried the switch to obtain the physical link connected to Host 520. The subscription requests notification of physical link 550 failing. At time 2, physical link 550 fails. At time 3, the switch sends a notification of link failure to host 530.

FIG. 6 is a block diagram that illustrates an example system using heartbeat-based node failure detection, in accordance with one or more embodiments. Operations not illustrated in FIG. 6 may be performed instead of or in addition to the illustrated operations. Accordingly, the operations as described herein should not be construed to limit the scope of any of the claims.

In FIG. 6, node cluster 500 also includes Host 540 that is connected to the switch by Physical Link 570. At time 1, host 520 hangs. At time 2, host 530 sends a heartbeat message to host 520. Although the heartbeat message is sent over physical link 550, host 520 is unable to process and respond to the message. After waiting for a timeout interval with no response from host 520, host 530 issues a first request for status of physical link 550 and traffic data for the link. At time 4, the switch sends a status indication that physical link 550 is operational (up) and a (first) traffic indicator. In an embodiment, the traffic indicator may comprise the number of bytes that have traversed the link since the switch was last started. At time 5, which occurs at a certain amount of time after time 4, host 530 issues a second request for a traffic indicator for physical link 550. At time 6, the switch sends a second traffic indicator. The difference between the second traffic indicator and the first traffic indicator provides the amount of traffic that was sent/received over physical link 550 during the interval between the first request and the second request. If the amount of traffic during that interval indicates an anomaly, then at time 7, host 530 may collaborate with other active nodes in the cluster to determine whether to evict host 520 from the cluster.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is labeled with a tenant ID. A tenant is permitted access to a particular network resource only if the tenant and the particular network resources are associated with a same tenant ID.

In an embodiment, each tenant is associated with a tenant ID. Each application, implemented by the computer network, is labeled with a tenant ID. Additionally or alternatively, each data structure and/or dataset, stored by the computer network, is labeled with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be labeled with a tenant ID. Only a tenant associated with the corresponding tenant ID may access data of a particular database. As another example, each entry in a database implemented by a multi-tenant computer network may be labeled with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
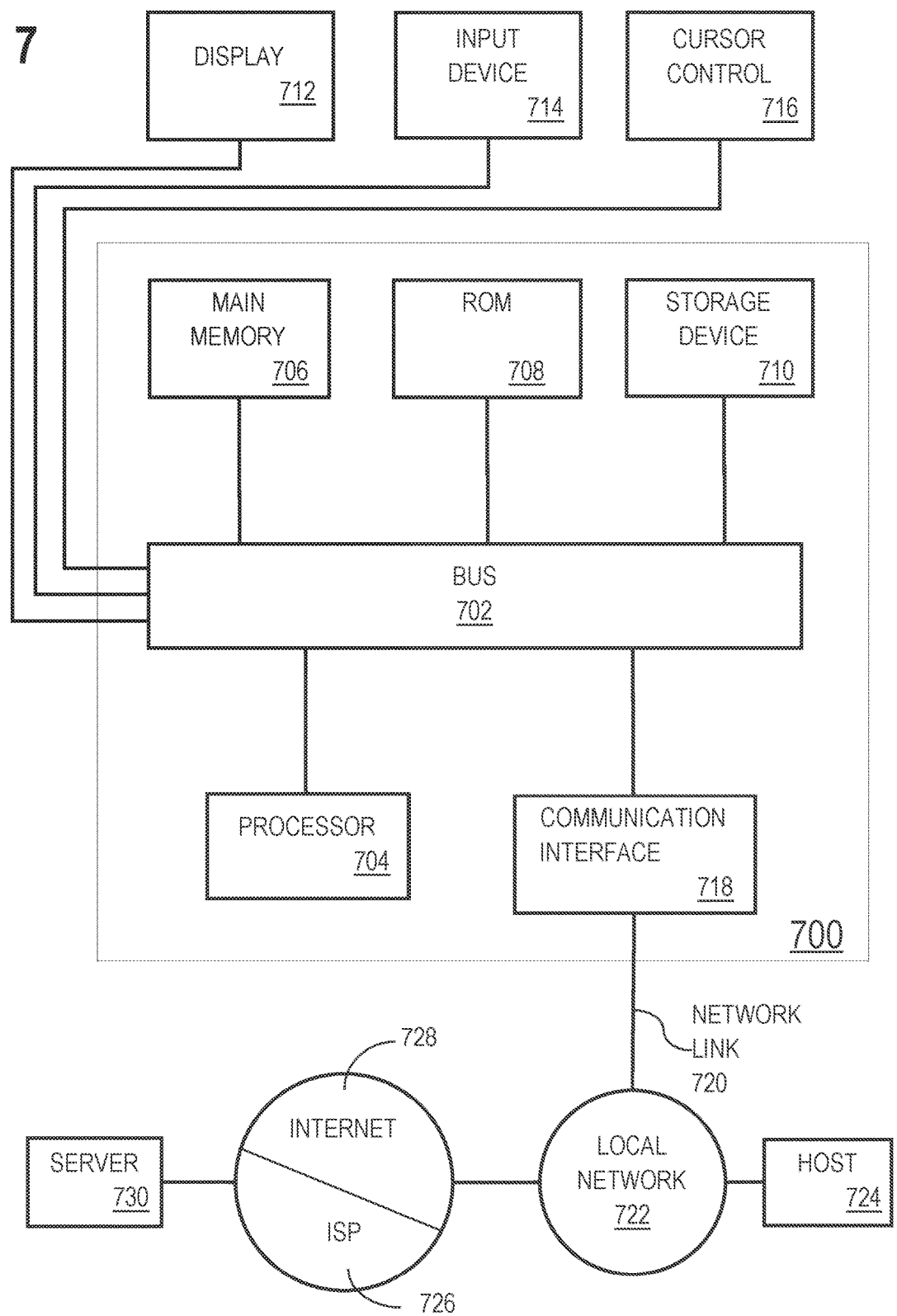
FIG. 7 shows a block diagram that illustrates a computer system, in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    monitoring network traffic, during a first period of time corresponding to a time period between a first time and a second time, on a physical link connected to a target node, wherein monitoring the network traffic comprises:
        receiving first information regarding the physical link connecting the target node and a network device at the first time, including an operational status of the physical link at the first time and an amount of traffic that has traversed the physical link as of the first time;
        receiving second information regarding the physical link connecting the target node and the network device at the second time subsequent to the first time, including an operational status of the physical link at the second time and an amount of traffic that has traversed the physical link as of the second time; and
        determining an amount of network traffic during the first period of time over the physical link connecting the target node and the network device, at least by computing a difference between the amount of traffic that has traversed the physical link as of the second time and the amount of traffic that has traversed the physical link as of the first time;
    determining that the amount of network traffic, over the physical link during the first period of time, meets a traffic threshold;
    responsive at least to determining that the network traffic, over the physical link during the first period of time, meets the traffic threshold: refraining from initiating a node eviction process to remove the target node from a node cluster;
    monitoring network traffic, during a second period of time, on the physical link connected to the target node;
    determining that an amount of the network traffic, during the second period of time, does not meet the traffic threshold; and
    responsive at least to determining that the amount of network traffic, during the second period of time, does not meet the traffic threshold: initiating a node eviction process to remove the target node from the node cluster.

2. The medium of claim 1, the operations further comprising:
    determining that a timeout interval elapses without receiving a response to a heartbeat message transmitted to the target node;
    wherein the monitoring the network traffic is performed in response to the determining that the timeout interval elapses without receiving the response to the heartbeat message.

3. The medium of claim 1, wherein the second time is subsequent to the first time by a fixed amount, and wherein the traffic threshold is selected based on the fixed amount.

4. The medium of claim 1, the operations further comprising:
    determining that the target node failed to write data to a particular memory location accessible to nodes within a same cluster as the target node;
    wherein the monitoring the network traffic is performed in response to the determining that the target node failed to write data to a particular memory location.

5. The medium of claim 1, wherein the node eviction process is initiated by a particular node within a same cluster as the target node.

6. A method comprising:
    monitoring network traffic, during a first period of time corresponding to a time period between a first time and a second time, on a physical link connected to a target node, wherein monitoring the network traffic comprises:
        receiving first information regarding the physical link connecting the target node and a network device at the first time, including an operational status of the physical link at the first time and an amount of traffic that has traversed the physical link as of the first time;
        receiving second information regarding the physical link connecting the target node and the network device at the second time subsequent to the first time, including an operational status of the physical link at the second time and an amount of traffic that has traversed the physical link as of the second time; and
        determining an amount of network traffic during the first perdiod of time over the physical link connecting the target node and the network device, at least by computing a difference between the amount of traffic that has traversed the physical link as of the second time and the amount of traffic that has traversed the physical link as of the first time;
    determining that the amount of network traffic, over the physical link during the first period of time, meets a traffic threshold;
    responsive at least to determining that the network traffic, over the physical link during the first period of time, meets the traffic threshold: refraining from initiating a node eviction process to remove the target node from a node cluster;
monitoring network traffic, during a second period of time, on the physical link connected to the target node;
determining that an amount of the network traffic, during the second period of time, does not meet the traffic threshold; and
responsive at least to determining that the amount of network traffic, during the second period of time, does not meet the traffic threshold: initiating a node eviction process to remove the target node from the node cluster,
wherein the method is performed by at least one device including a hardware processor.

7. The method of claim 6, further comprising:
determining that a timeout interval elapses without receiving a response to a heartbeat message transmitted to the target node;
wherein the monitoring the network traffic is performed in response to the determining that the timeout interval elapses without receiving the response to the heartbeat message.

8. The method of claim 6, wherein the second time is subsequent to the first time by a fixed amount, and wherein the traffic threshold is selected based on the fixed amount.

9. The method of claim 6, the operations further comprising:
determining that the target node failed to write data to a particular memory location accessible to nodes within a same cluster as the target node;
wherein the monitoring the network traffic is performed in response to the determining that the target node failed to write data to a particular memory location.

10. The method of claim 6, wherein the node eviction process is initiated by a particular node within a same cluster as the target node.

11. A system comprising:
at least one hardware device including a processor; and
the system configured to perform operations comprising:
monitoring network traffic, during a first period of time corresponding to a time period between a first time and a second time, on a physical link connected to a target node, wherein monitoring the network traffic comprises:
receiving first information regarding the physical link connecting the target node and a network device at the first time, including an operational status of the physical link at the first time and an amount of traffic that has traversed the physical link as of the first time;
receiving second information regarding the physical link connecting the target node and the network device at the second time subsequent to the first time, including an operational status of the physical link at the second time and an amount of traffic that has traversed the physical link as of the second time; and
determining an amount of network traffic during the first period of time over the physical link connecting the target node and the network device, at least by computing a difference between the amount of traffic that has traversed the physical link as of the second time and the amount of traffic that has traversed the physical link as of the first time;
determining that the amount of network traffic, over the physical link during the first period of time, meets a traffic threshold;
responsive at least to determining that the network traffic, over the physical link during the first period of time, meets the traffic threshold: refraining from initiating a node eviction process to remove the target node from a node cluster;
monitoring network traffic, during a second period of time, on the physical link connected to the target node;
determining that an amount of the network traffic, during the second period of time, does not meet the traffic threshold; and
responsive at least to determining that the amount of network traffic, during the second period of time, does not meet the traffic threshold: initiating a node eviction process to remove the target node from the node cluster.

12. The system of claim 11, the operations further comprising:
determining that a timeout interval elapses without receiving a response to a heartbeat message transmitted to the target node;
wherein the monitoring the network traffic is performed in response to the determining that the timeout interval elapses without receiving the response to the heartbeat message.

13. The system of claim 11, wherein the second time is subsequent to the first time by a fixed amount, and wherein the traffic threshold is selected based on the fixed amount.

14. The system of claim 11, the operations further comprising:
determining that the target node failed to write data to a particular memory location accessible to nodes within a same cluster as the target node;
wherein the monitoring the network traffic is performed in response to the determining that the target node failed to write data to a particular memory location.

* * * * *

UNITED STATES PATENT AND TRADEMARK OFFICE
CERTIFICATE OF CORRECTION

PATENT NO. : 11,463,303 B2
APPLICATION NO. : 17/095917
DATED : October 4, 2022
INVENTOR(S) : Zhu et al.

It is certified that error appears in the above-identified patent and that said Letters Patent is hereby corrected as shown below:

In the Claims

In Column 16, Line 57, in Claim 6, delete "perdiod" and insert -- period --, therefor.

Signed and Sealed this
Thirteenth Day of June, 2023

Katherine Kelly Vidal
*Director of the United States Patent and Trademark Office*